US011182050B2

(12) United States Patent
Sento et al.

(10) Patent No.: US 11,182,050 B2
(45) Date of Patent: Nov. 23, 2021

(54) INFORMATION PROCESSING APPARATUS, IMAGE FORMING APPARATUS, AND NON-TRANSITORY COMPUTER READABLE MEDIUM

(71) Applicant: FUJIFILM BUSINESS INNOVATION CORP., Tokyo (JP)

(72) Inventors: Chizuko Sento, Kanagawa (JP); Naozo Yoshioka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/514,095

(22) Filed: Jul. 17, 2019

(65) Prior Publication Data
US 2019/0339826 A1   Nov. 7, 2019

Related U.S. Application Data

(63) Continuation of application No. 15/446,716, filed on Mar. 1, 2017, now Pat. No. 10,459,604.

(30) Foreign Application Priority Data

Jul. 1, 2016   (JP) .................. 2016-131696

(51) Int. Cl.
*G06F 3/0482*   (2013.01)
*G06F 3/0481*   (2013.01)
*G06F 21/31*   (2013.01)
(52) U.S. Cl.
CPC ........ *G06F 3/0482* (2013.01); *G06F 3/04817* (2013.01); *G06F 21/31* (2013.01)

(58) Field of Classification Search
None
See application file for complete search history.

(56) References Cited

U.S. PATENT DOCUMENTS

| 5,602,997 | A | 2/1997 | Carpenter et al. |
| 8,640,049 | B2 | 1/2014 | Chung et al. |
| 2003/0020760 | A1 | 1/2003 | Takatsu et al. |
| 2004/0056898 | A1 | 3/2004 | Jetha et al. |
| 2004/0155908 | A1 | 8/2004 | Wagner |

(Continued)

FOREIGN PATENT DOCUMENTS

| JP | 2007-512635 A | 5/2007 |
| JP | 2009-53758 A | 3/2009 |
| JP | 2011-053790 A | 3/2011 |

OTHER PUBLICATIONS

Jun. 3, 2020 Office Action issued in Chinese Patent Application No. 201710303348.1.

(Continued)

*Primary Examiner* — William L Bashore
*Assistant Examiner* — Nathan K Shrewsbury
(74) *Attorney, Agent, or Firm* — Oliff PLC

(57) ABSTRACT

An information processing apparatus receives a plurality of electronic messages and calculates a number of electronic messages that satisfy a preset condition among the plurality of electronic messages. The preset condition may be associated with address information of the electronic message. The calculated number is displayed as a badge on an icon for activating an application that refers to the received electronic messages.

8 Claims, 18 Drawing Sheets

(56) References Cited

U.S. PATENT DOCUMENTS

| | | | |
|---|---|---|---|
| 2004/0172455 A1* | 9/2004 | Green | H04L 51/24 709/207 |
| 2005/0076302 A1 | 4/2005 | Okamoto | |
| 2005/0091314 A1* | 4/2005 | Blagsvedt | G06F 3/04842 709/204 |
| 2005/0120306 A1 | 6/2005 | Klassen et al. | |
| 2005/0188320 A1* | 8/2005 | Bocking | G06F 3/04895 715/752 |
| 2009/0055494 A1* | 2/2009 | Fukumoto | G06Q 10/107 709/206 |
| 2009/0144655 A1 | 6/2009 | Hardy et al. | |
| 2009/0268716 A1 | 10/2009 | Lamb et al. | |
| 2009/0305732 A1* | 12/2009 | Marcellino | H04L 51/24 455/466 |
| 2011/0055763 A1 | 3/2011 | Utsuki et al. | |
| 2011/0148786 A1 | 6/2011 | Day et al. | |
| 2011/0154268 A1 | 6/2011 | Trent, Jr. et al. | |
| 2011/0239162 A1 | 9/2011 | Kido | |
| 2012/0030623 A1* | 2/2012 | Hoellwarth | G06F 3/04883 715/811 |
| 2012/0179978 A1 | 7/2012 | Klassen et al. | |
| 2012/0246577 A1 | 9/2012 | Klassen et al. | |
| 2013/0027429 A1* | 1/2013 | Hogg | H04W 4/12 345/633 |
| 2013/0147793 A1 | 6/2013 | Jeon et al. | |
| 2013/0198671 A1 | 8/2013 | Kasai | |
| 2013/0275519 A1* | 10/2013 | Nichols | G06Q 10/107 709/206 |
| 2013/0326418 A1 | 12/2013 | Utsuki et al. | |
| 2014/0040769 A1* | 2/2014 | Lazaridis | G06F 3/04883 715/752 |
| 2014/0096057 A1 | 4/2014 | Marston et al. | |
| 2014/0189515 A1* | 7/2014 | Waldman | G06F 16/7844 715/719 |
| 2015/0046879 A1 | 2/2015 | Orimoto et al. | |
| 2016/0050307 A1* | 2/2016 | Yan | H04W 68/005 455/412.2 |
| 2016/0154559 A1* | 6/2016 | Yu | G06F 3/04842 715/769 |
| 2017/0003840 A1 | 1/2017 | Utsuki et al. | |
| 2017/0026810 A1 | 1/2017 | Yang | |
| 2017/0046024 A1* | 2/2017 | Dascola | G06F 3/04845 |
| 2018/0046333 A1* | 2/2018 | Klassen | G06F 3/0488 |

OTHER PUBLICATIONS

Feb. 4, 2020 Office Action issued in Japanese Patent Application No. 2016-131696.
Mar. 9, 2021 Office Action issued in Japanese Patent Application No. 2020-066479.
Nov. 29, 2018 Office Action issued in U.S. Appl. No. 15/446,716.
Aug. 24, 2021 Office Action issued in Japanese Patent Application No. 2020-066479.

* cited by examiner

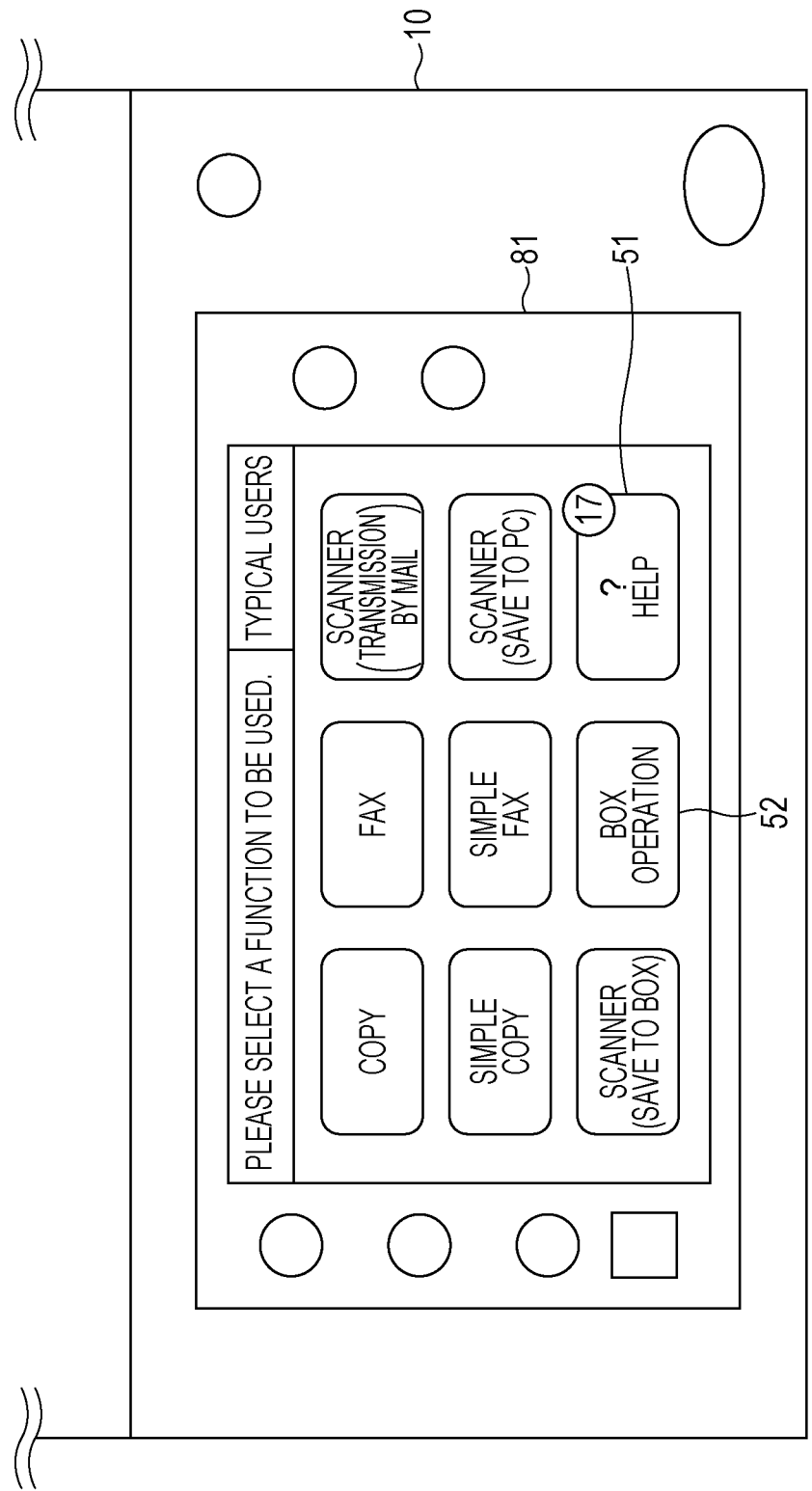

FIG. 12

| ENTRY | FUNCTION/ SPECIFICATIONS |
|---|---|
| DESTINATION COUNTRY | JAPAN |
| AUTOMATIC DOCUMENT FEEDER | AVAILABLE |
| MODEL NAME | D5575 |
| PRINT SPEED | 75 PAGES/MIN |
| MANUAL FEED OPTION | AVAILABLE |
| STAPLE OPTION | UNAVAILABLE |
| PUNCH OPTION | UNAVAILABLE |

FIG. 13

| CATEGORY | HELP INFORMATION | DISPLAY DATA |
|---|---|---|
| "FREQUENTLY ASKED QUESTIONS" | ○○○○○ | |
| "FREQUENTLY ASKED QUESTIONS" | △△△△△△ | 🗎 |
| "SCAN" | ...... | |
| "ADDRESS REGISTRATION/CHANGE" | ...... | |
| "PRINT" | ...... (FOR LOW-SPEED DEVICES) | 🗎 |
| "PRINT" | ...... (FOR HIGH-SPEED DEVICES) | 🗎 |
| "PRINT" | FOR PRINTING OF POSTCARDS USING THE MANUAL FEED SLOT .... | |

{ NEW INCOMING INFORMATION INDEPENDENT OF APPARATUS FUNCTIONS

{ NEW INCOMING INFORMATION DEPENDENT ON APPARATUS FUNCTIONS

INFORMATION PROCESSING APPARATUS, IMAGE FORMING APPARATUS, AND NON-TRANSITORY COMPUTER READABLE MEDIUM

CROSS-REFERENCE TO RELATED APPLICATIONS

This application is a continuation of U.S. patent application Ser. No. 15/446,716, filed Mar. 1, 2017, which claims the benefit of Japanese Patent Application No. 2016-131696, filed Jul. 1, 2016. The entire contents of these documents are hereby incorporated by reference.

BACKGROUND

(i) Technical Field

The present invention relates to an information processing apparatus, an image forming apparatus, and a non-transitory computer readable medium.

(ii) Related Art

Some mobile phone terminals, such as smartphones, are designed such that multiple icons for activating application programs (hereinafter referred to as "applications") are collectively storable and manageable within a single folder on a display screen thereof. In this case, when new incoming information items arrive for multiple icons, in some cases, a badge is displayed in the upper right corner of each icon to indicate the number of new incoming information items for the icon and a badge is further displayed in the upper right corner of the folder to indicate the sum total of new incoming information items for all the icons stored in the folder.

In other cases, on a menu screen of the apparatuses, icons associated with plural functions and a help icon moved to a help screen explaining the functions associated with the icons are displayed. When the help icon is selected and moved to the help screen, the help screen shows icons for displaying respective explanatory information on the functions.

When the technique described above for displaying a badge on a superior icon to indicate the total number of new incoming information items for subordinate icons is applied to the menu screen of the apparatuses described above, the number of new incoming information items for individual functions is displayed on or near the help icon.

SUMMARY

According to an aspect of the invention, there is provided an information processing apparatus including a display, a receiver, and a controller. The display displays a first screen including plural first icons and a second icon. Each of the plural first icons is a graphical representation associated with one of plural functions. The second icon is associated with an explanatory function explaining the plural functions. The display displays a second screen in response to selection of the second icon on the first screen. The second screen includes a plurality of third icons for providing explanatory information concerning at least some of the plural functions. The receiver receives explanatory information concerning the plural functions. In response to the receiver receiving a new explanatory information item, the controller controls the display to change a display style of a third icon related to the received new explanatory information item among the plurality of third icons on the second screen and not to change a display style of the second icon on the first screen.

BRIEF DESCRIPTION OF THE DRAWINGS

Exemplary embodiments of the present invention will be described in detail based on the following figures, wherein:

FIG. 8 illustrates a comparative example in which the total number of new incoming information items is displayed on the help icon;

FIG. 12 illustrates an example of apparatus information stored in an apparatus information storage unit of the image forming apparatus according to the first exemplary embodiment of the present invention;

FIG. 13 illustrates an example configuration of new incoming information delivered from a server apparatus;

DETAILED DESCRIPTION

Exemplary embodiments of the present invention will be described in detail hereinafter with reference to the drawings.

First Exemplary Embodiment

Figure 1:
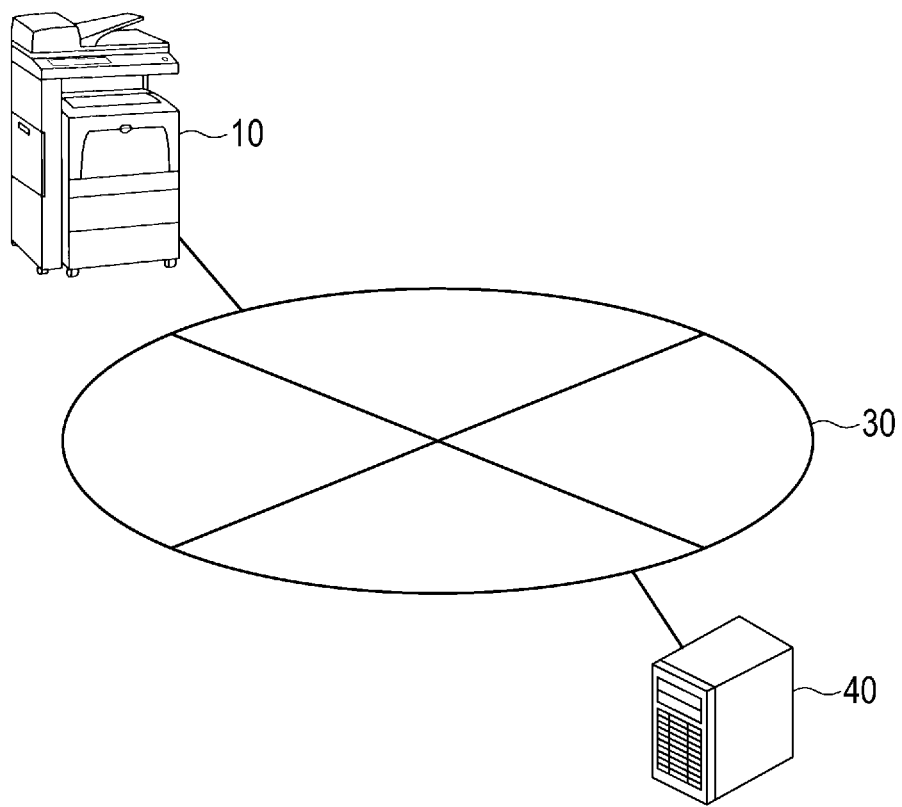
FIG. 1 illustrates a system configuration of an image forming system according to a first exemplary embodiment of the present invention.

FIG. 1 illustrates a system configuration of an image forming system according to a first exemplary embodiment of the present invention.

As illustrated in FIG. 1, the image forming system according to this exemplary embodiment includes an image forming apparatus 10 and a server apparatus 40, which communicate with each other over a network 30. The image forming apparatus 10 may be an apparatus, called a multifunction peripheral (MFP), having multiple functions such as a printing function, a scanning function, a copying function, and a facsimile function.

The server apparatus 40 has a function of delivering help information to the image forming apparatus 10. The help information is explanatory information including operation methods for various functions such as scanning, printing, copying, and facsimile functions and various information common to the functions, such as registration/change of address information, error information, and frequently asked questions. It is to be understood that the explanatory information is not limited to help information.

When new help information is created, the new help information is registered in the server apparatus 40 and is delivered from the server apparatus 40 to the image forming apparatus 10 via the network 30. The delivery of help information involves not only the way in which the server apparatus 40 transmits the help information to the image forming apparatus 10 but also the way in which the image forming apparatus 10 periodically accesses the server apparatus 40 to check the presence of newly generated help information (new incoming information) and downloads the help information.

Figure 2:
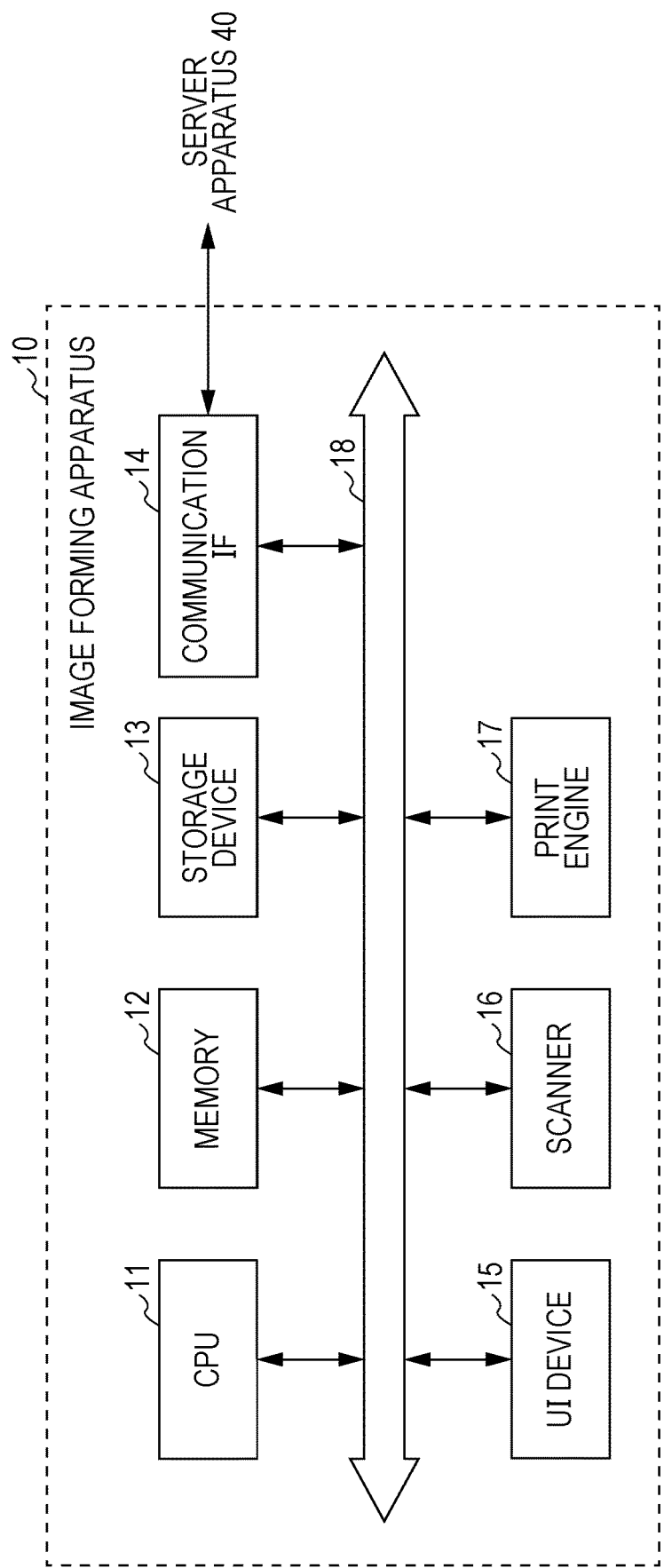
FIG. 2 is a block diagram illustrating a hardware configuration of the image forming apparatus according to the first exemplary embodiment of the present invention.

FIG. 2 illustrates a hardware configuration of the image forming apparatus 10 according to this exemplary embodiment.

As illustrated in FIG. 2, the image forming apparatus 10 includes a central processing unit (CPU) 11, a memory 12, a storage device 13 such as a hard disk drive (HDD), a communication interface (IF) 14 that transmits and receives data to and from an external device via the network 30, a user interface (UI) device 15 that includes a touch panel or a liquid crystal display and a keyboard, a scanner 16, and a print engine 17. The components described above are connected to one another via a control bus 18.

The print engine 17 prints an image on a recording medium such as a printing sheet through steps such as charging, exposure, developing, transfer, and fixing.

The CPU 11 executes a predetermined process in accordance with a control program stored in the memory 12 or the storage device 13 to control the operation of the image forming apparatus 10. In this exemplary embodiment, the CPU 11 reads and executes a control program stored in the memory 12 or the storage device 13. Alternatively, a storage medium such as a compact disc read-only memory (CD-ROM) that stores the control program described above may be provided to the CPU 11.

Figure 3:
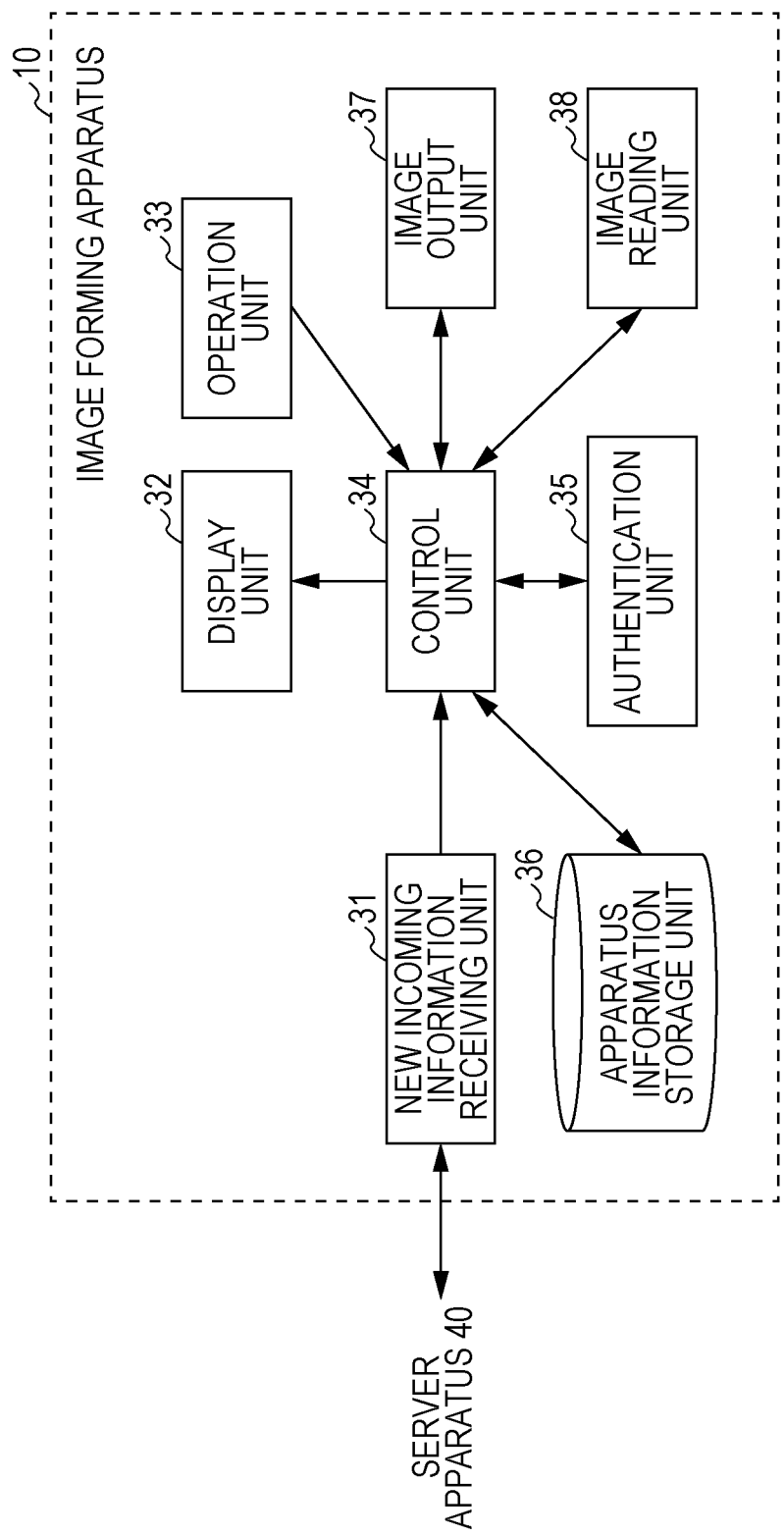
FIG. 3 is a block diagram illustrating a functional configuration of the image forming apparatus according to the first exemplary embodiment of the present invention.

FIG. 3 is a block diagram illustrating a functional configuration of the image forming apparatus 10 which is implemented by the execution of the control program described above.

As illustrated in FIG. 3, the image forming apparatus 10 according to this exemplary embodiment includes a new incoming information receiving unit 31, a display unit 32, an operation unit 33, a control unit 34, an authentication unit 35, an apparatus information storage unit 36, an image output unit 37, and an image reading unit 38.

The image output unit 37 executes a process of outputting an image on a recording medium such as a printing sheet. The image reading unit 38 executes a process of scanning a document to read a document image.

The control unit 34 performs various control such as controlling the operation of the image output unit 37 and the image reading unit 38 in accordance with operation information input from the operation unit 33 and displaying various information on the display unit 32.

In FIG. 3, the display unit 32 and the operation unit 33 are depicted as separate components. In this exemplary embodiment, however, the display unit 32 and the operation unit 33 are formed into a single component implemented by a touch panel.

The new incoming information receiving unit 31 receives from the server apparatus 40 explanatory information concerning multiple functions implemented by using either or both of the image output unit 37 and the image reading unit 38, such as the copying, scanning, and printing functions.

The new incoming information receiving unit 31 may access the server apparatus 40 at regular intervals, such as daily, to receive new help information as new incoming information or may access the server apparatus 40 in accordance with instructions input from the operation unit 33 to receive new help information as new incoming information.

The authentication unit 35 authenticates a user who is to use the image forming apparatus 10 by using an authentication method with an integrated-circuit (IC) card, for example, or by using any other method.

The apparatus information storage unit 36 stores apparatus information that is information concerning the specifications of the image forming apparatus 10 or the functions supported by the image forming apparatus 10. Specifically, the apparatus information storage unit 36 stores, as apparatus information, information on the shipping destination of the image forming apparatus 10, the model name of the image forming apparatus 10, and information concerning the functions of the image forming apparatus 10, such as the print speed, and the presence of an automatic document feeder. Specific examples of the apparatus information will be described below.

Figure 4:
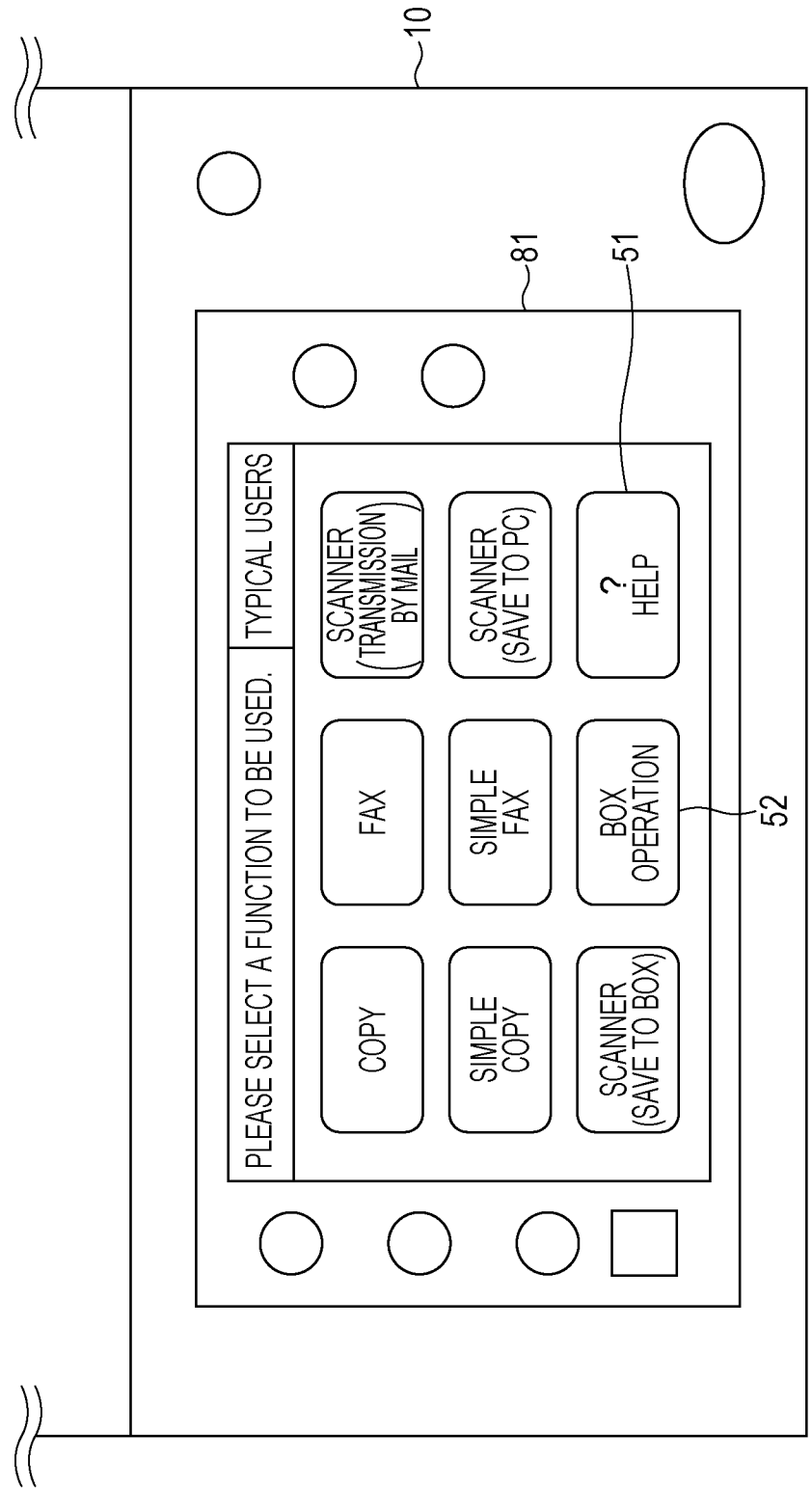
FIG. 4 illustrates an example menu screen displayed on an operation panel of the image forming apparatus according to the first exemplary embodiment of the present invention.

As illustrated in FIG. 4, the display unit 32 displays a menu screen on an operation panel 81 under control of the control unit 34. The menu screen includes multiple icons 52 that are graphical representations each associated with one of the multiple functions, and a help icon 51 associated with a function explaining the multiple functions. When one of the icons 52 illustrated in FIG. 4, such as a "Copy", "Fax", "Scanner", or "Box operation" icon, is operated by a touch with a pointing object such as a finger or a pen, a screen for changing the settings of the corresponding function appears.

Figure 5:
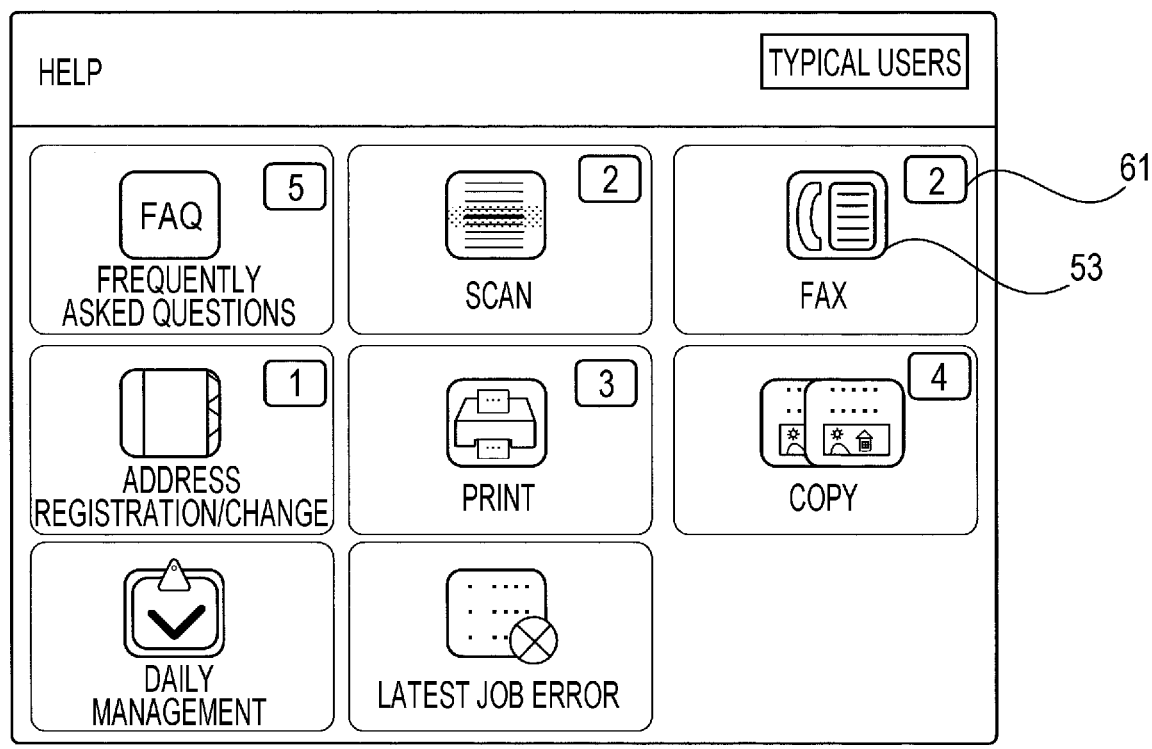
FIG. 5 illustrates an example help screen that appears when a help icon is operated.

When the help icon 51 is selected on the menu screen, as illustrated in FIG. 5, the display unit 32 displays a help screen including multiple icons 53 for providing help information concerning at least some of the multiple functions.

The term "icon", as used herein, refers to a graphical representation displayed on a display screen and used to activate a specific application program or indicate an operation position moved to a specific screen. In some cases, the graphical representation includes not only a designed shape but also various characters such as alphabetic characters, hiragana, katakana, and kanji.

On the help screen illustrated in FIG. 5, numerical information indicating the numbers of new help information (new incoming information) items that have been added are displayed as badges 61 in the upper right corners of the icons 53.

For example, the badge 61 displayed on the icon 53 for the "Frequently Asked Questions" category shows the number "5" to indicate that five new incoming information items have been added.

Figure 6:
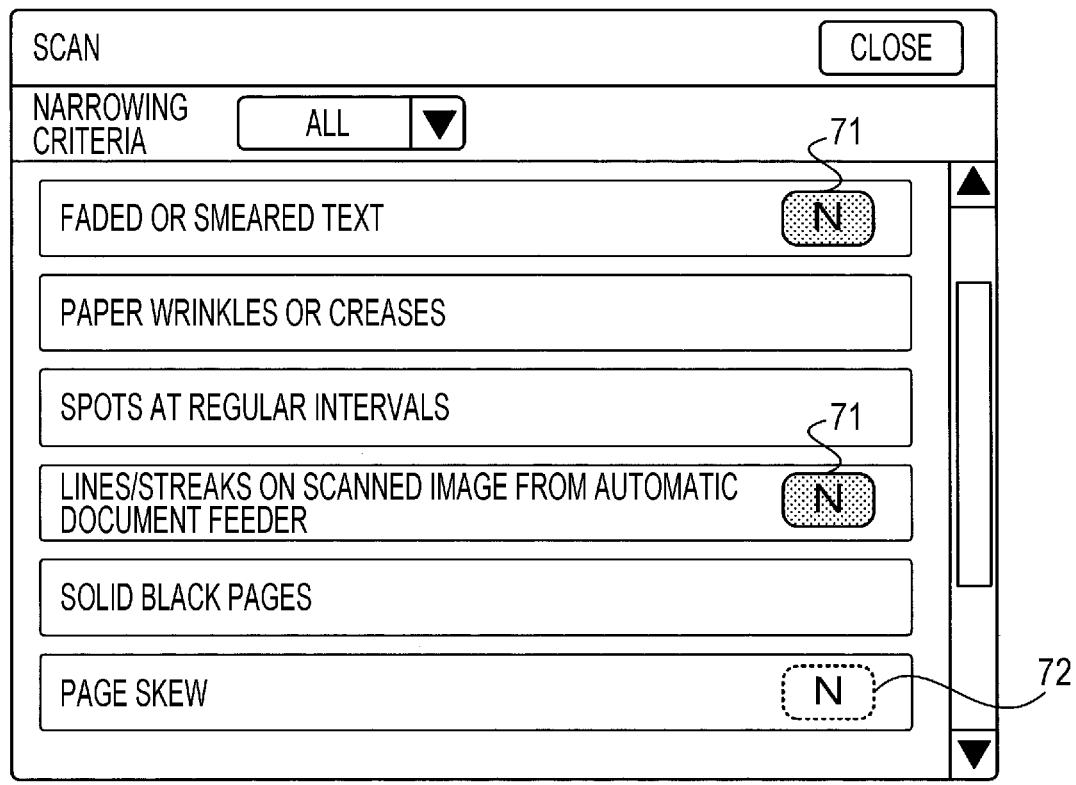
FIG. 6 illustrates an example list of help information items displayed when a "Scan" icon is touched.

Touching the icons 53 displayed on the help screen illustrated in FIG. 5 results in the display of lists of help information items for the respective categories. FIG. 6 illustrates an example list of help information items displayed when the icon 53 for "Scan" is touched, for example.

In FIG. 6, a list of help information items for the "Scan" category is displayed and new incoming help information items are marked with the letter "N" as a new arrival mark to indicate new incoming information. In FIG. 6, a new arrival mark 71 displayed in a dark color indicates that the corresponding new incoming information item has not been viewed, and a new arrival mark 72 displayed in a light color indicates that the corresponding new incoming information item has been viewed.

In this manner, when any one of the icons 53 on the help screen is selected, the control unit 34 displays on the display unit 32 a list of help information items for the function associated with the selected icon 53. Further, the control unit 34 controls the display unit 32 to display newly added help information items by adding the new arrival marks 71 and 72, which are indications indicating newly added help information, to the newly added help information items and to display the newly added help information items in such a manner that a viewed help information item and an unviewed help information item are displayed in different display styles.

In FIG. 6, a new arrival mark of a help information item that has been viewed once is changed to a display style that allows the viewer to understand that the help information item has been viewed. Alternatively, the method for switching between display styles of a new arrival mark may be changed in accordance with the degree of importance of the help information item.

Specifically, when a new incoming information item is viewed, the control unit 34 may control the display unit 32 to make the new incoming information item remain in an unviewed status if the new incoming information item, which has been viewed, has a high degree of importance and to set the new incoming information item to be in a viewed status if the new incoming information item, which has been viewed, has a low degree of importance.

Figure 7:
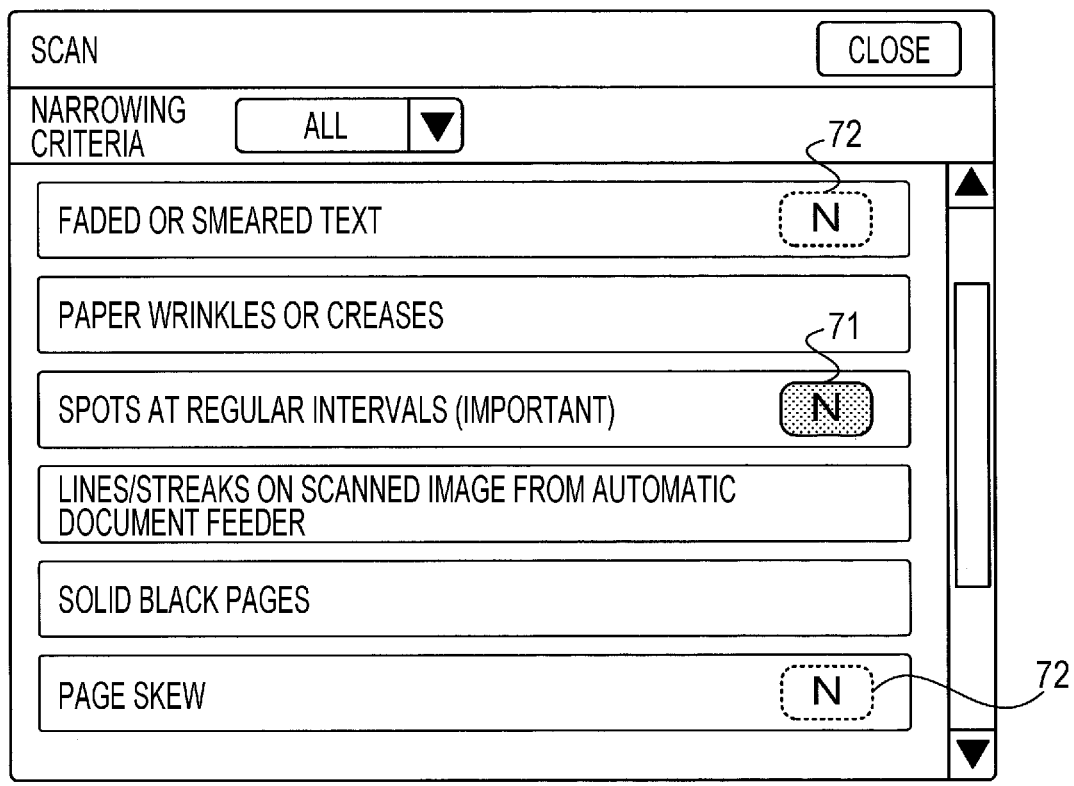
FIG. 7 illustrates an example list of help information items when a method for switching between new arrival marks is changed in accordance with the degree of importance of the new incoming information item.

FIG. 7 illustrates an example list of help information items when the method for switching between new arrival marks is changed in the manner described above in accordance with the degree of importance of the new incoming information item.

The display unit 32 may be controlled only when the settings for changing the method for switching between new arrival marks in accordance with the degree of importance of the new incoming information item have been set in advance by an administrator or any other suitable person, or, for example, a switching button may be displayed to switch between new arrival marks at the desired timing.

In FIG. 7, an example display screen on which all the new incoming information items have been viewed once is illustrated. The example demonstrates that the degree of importance of the help information item with the title "Spots at regular intervals" is set to be high and the new arrival mark 71 in a dark color is still displayed although this help information item has already been viewed.

When a new help information item is received by the new incoming information receiving unit 31, the control unit 34 controls the display unit 32 to change on the help screen the display style of the icon 53 associated with the new incoming information item among the multiple icons 53 on the help screen to provide a new arrival notification indicating addition of a new explanatory information item.

Specifically, as also described above, the control unit 34 controls the display unit 32 to display, as a badge 61 in the upper right corner of each of the icons 53 on the help screen, numerical information indicating the number of new help information items that have been added to provide a new arrival notification.

Note that the control unit 34 maintains, even if the newly added help information items have been viewed, the badge 61 on the icon 53 on the help screen for a preset period, for example, for one month.

Information concerning the display period may be received as information included in a new incoming information item, and the display period may be a period represented by the information. Alternatively, the display period may be a period determined in advance in accordance with the setting of the apparatus. If both a period represented by information and a period determined in accordance with the setting of the apparatus are present, a longer one (or shorter one) of the periods may be used or the average of the periods may be calculated (for example, if the display period for a new incoming information item, which is included in the new incoming information item, is one month and the display period for the new incoming information item, which is determined in accordance with the setting of the apparatus, is two months, a display period of 1.5 months is used), and a badge for the new incoming information item may be continuously displayed for this period.

The reason for this is as follows: since an apparatus such as a multifunction peripheral is typically used by many users, the deletion of the badges 61 only in response to viewing of new incoming information by the first user would make it difficult to inform other users of important help information.

The term "displaying a badge on an icon" or "displayed as a badge on an icon", as used herein, refers to, as an example, additionally displaying, on an icon or near an icon, numerical information indicating the number of new explanatory information items that have been added or content information indicating the content of new explanatory information items, or displaying an icon in such a manner that part of the icon is visually modified. The term "displaying a badge on an icon" or "displayed as a badge on an icon" is used to include not only a display style in which a badge is displayed within an icon but also a display style in which the display area of an icon and the display area of a badge at least partially overlap. The term "displaying a badge on an icon" or "displayed as a badge on an icon" is used to also include a display style that allows the viewer to identify an icon and a badge as being associated with each other even if the icon and the badge do not overlap.

Even when a new help information item is received by the new incoming information receiving unit 31, the control unit 34 controls the display unit 32 not to change the display style of the help icon 51 on the menu screen so that a new arrival notification indicating addition of a new help information item is not provided.

A description will now be given of a reason that even when new help information items are received by the new incoming information receiving unit 31 and new incoming information items are added to the respective categories in a help function, the display style of the help icon 51 on the menu screen is not changed nor is a badge displayed.

FIG. 8 illustrates a comparative example in which the total number of new incoming information items is displayed on the help icon 51, for example. As depicted in FIG. 8, in contrast to the example help screen according to this exemplary embodiment illustrated in FIG. 4, the number "17" is displayed on the help icon 51. That is, in FIG. 8, the number "17", which is equal to the total number of new incoming information items indicated by the respective badges 61 on the icons 53 on the help screen illustrated in FIG. 5, is displayed on the help icon 51.

As in the comparative example illustrated in FIG. 8, the display of the sum total of the numbers of new incoming information items as a badge on the help icon 51 causes an increase in the number within the badge each time a new incoming information item is newly added. In a multifunction peripheral such as the image forming apparatus 10 according to this exemplary embodiment, however, a menu screen is displayed on an operation panel in a normal standby condition and the display of a badge on the help icon 51 or an increasing number within the badge might be distracting to a user who is not familiar with the badge.

It is difficult for a user to identify the content of help information that has been added even though the user is able to understand the total number of new incoming information items. Thus, the total number of new incoming information items is not useful for a user who desires to refer to the help text for a specific function.

Additionally, a user who is to perform an operation such as copying, scanning, or facsimile transmission while viewing an operation panel of a printer might suffer from a condition that may leave them distracted by complex changes in the content displayed on the menu screen or by highlighted display of numerical information that is not understandable to keep them from concentrating on selecting an operation method or switching between operation methods.

In the foregoing description, to inform multiple users of the content of new help information items that have arrived, a badge indicating the number of new incoming information items is not changed even if the new incoming information items have been viewed. However, once a user is authenticated by the authentication unit 35, the number of new incoming information items that is displayed as a badge may be changed on a user-by-user basis.

In this case, when a new incoming information item is viewed by a user authenticated by the authentication unit 35, the control unit 34 displays a number as a badge on each of the icons 53 on a help screen presented to this user, the number being obtained by subtracting the number of viewed new incoming information items from the number of new incoming information items.

Figure 9A:
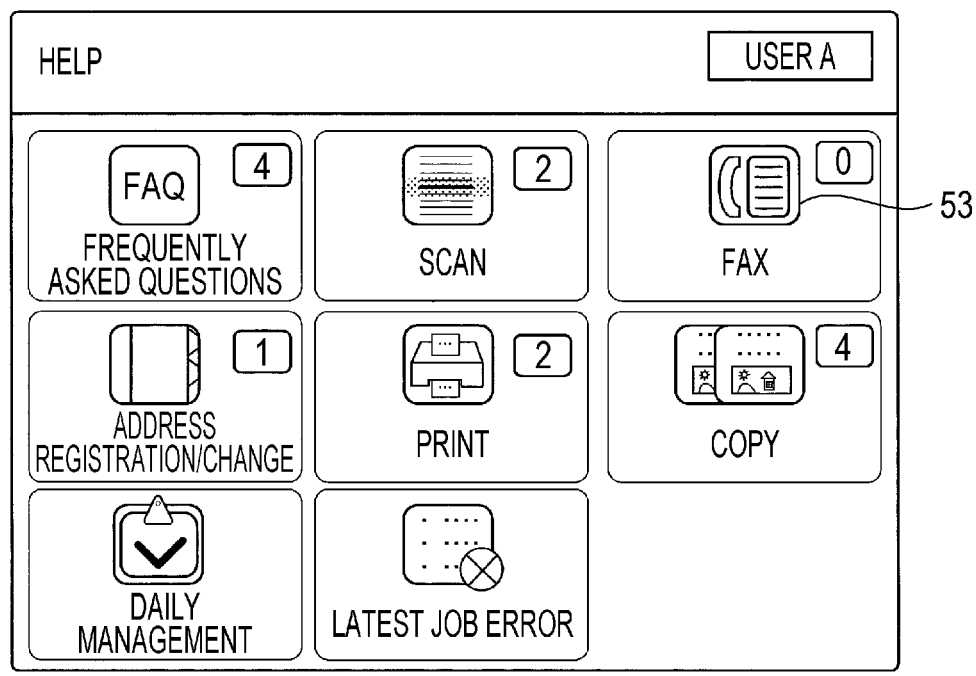
FIGS. 9A and 9B illustrate example display screens for individual users who have been authenticated and logged in on which the numbers of unviewed new incoming information items are displayed as badges on icons.
Figure 9B:
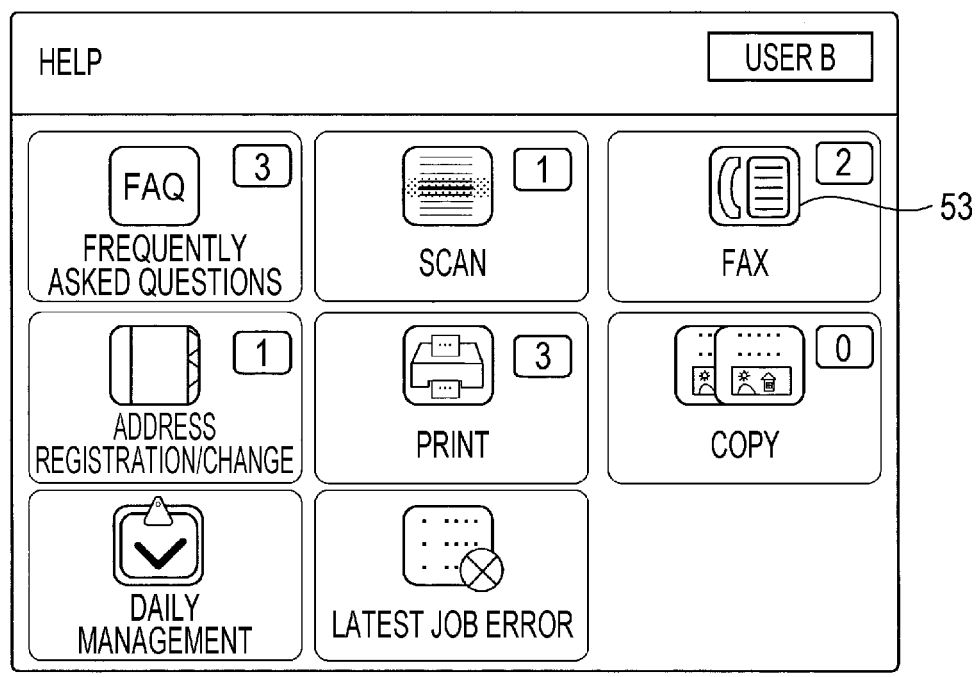

For example, on an example help screen illustrated in FIG. 9A, a user A who has been authenticated by the authentication unit 35 logs in and the number of unviewed new incoming information items that have not been viewed by the user A is displayed as a badge on each of the icons 53. In an example help screen illustrated in FIG. 9B, a user B who has been authenticated by the authentication unit 35 logs in and the number of unviewed new incoming information items that have not been viewed by the user B is displayed as a badge on each of the icons 53.

In this manner, the numbers of unviewed new incoming information items are displayed as badges for each user. This allows each user to grasp the number of new incoming information items that have not been viewed by the user.

In this case, badges may be displayed in such a manner that allows the viewer to identify both the number of unviewed new incoming information items and the number of viewed new incoming information items.

Figure 10:
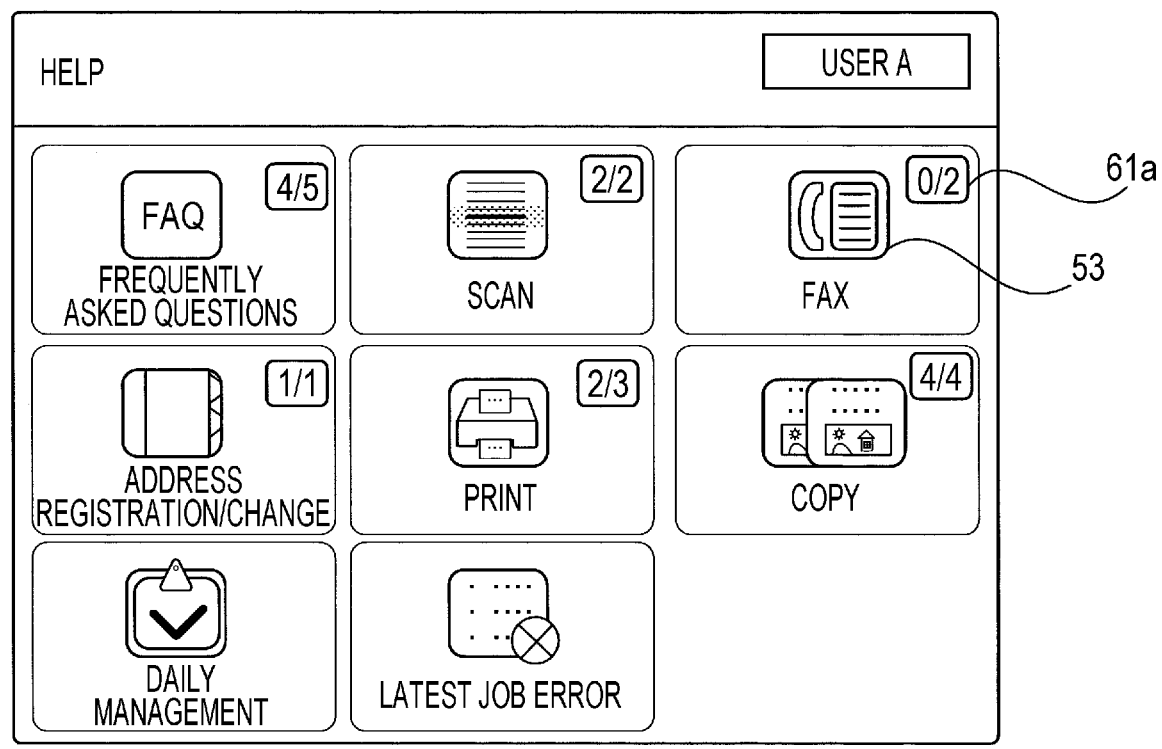
FIG. 10 illustrates an example help screen on which badges each indicating "the number of unviewed new incoming information items/the total number of new incoming information items" are displayed.
Figure 11:
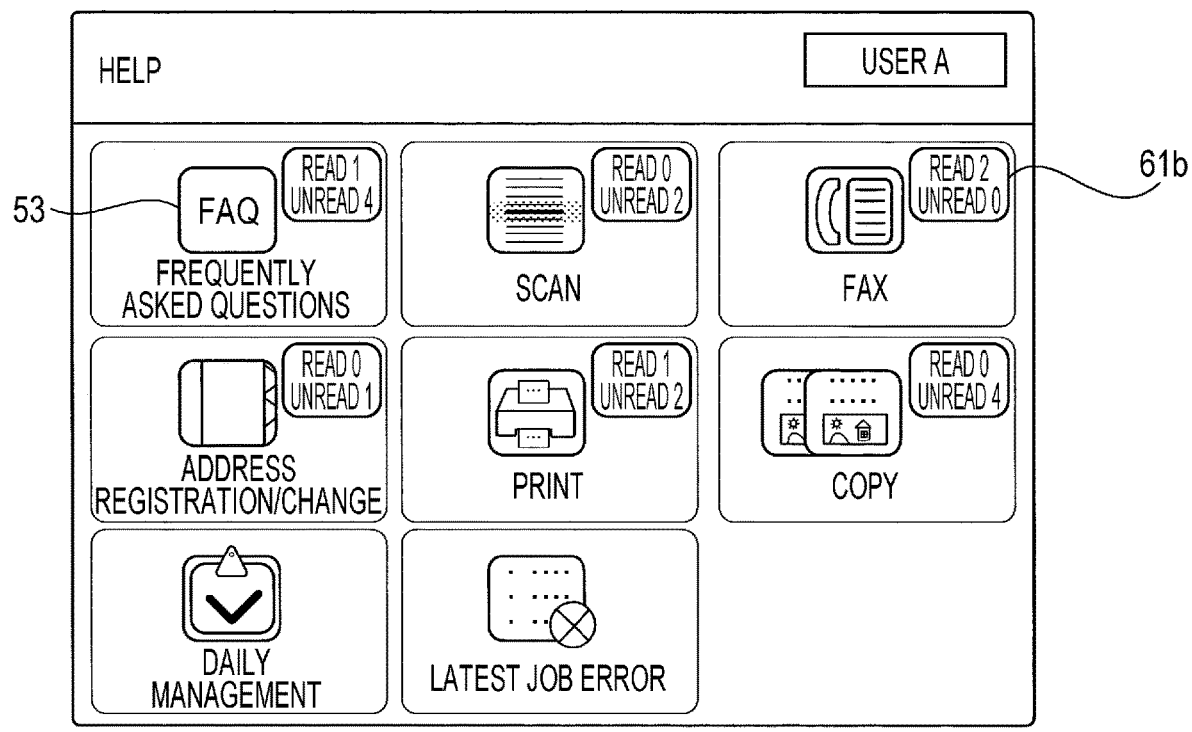
FIG. 11 illustrates an example help screen on which the number of viewed new incoming information items is displayed as the number of "read" items and the number of unviewed new incoming information items is displayed as the number of "unread" items.

Specifically, when a new incoming information item is viewed by a user authenticated by the authentication unit 35, as illustrated in FIG. 10 and FIG. 11, the control unit 34 displays a number displayed as a badge on each of the icon 53 on a help screen presented to the user in such a manner that the number of viewed new incoming information items and the number of unviewed new incoming information items are distinguishable from each other.

FIG. 10 illustrates an example help screen on which badges each indicating "the number of unviewed new incoming information items/the total number of new incoming information items" are displayed. In FIG. 10, for example, a "0/2" badge 61a is displayed on the icon 53 for the "Fax" category so as to understand that the number of unviewed new incoming information items is 0 and the total number of new incoming information items is 2. That is, in this case, the number of unviewed new incoming information items, namely, 0, is subtracted from the total number of new incoming information items, namely, 2, and the resulting value, namely, 2, indicates the number of viewed new incoming information items.

FIG. 11 illustrates an example help screen on which the number of viewed new incoming information items is displayed as the number of "read" items and the number of unviewed new incoming information items is displayed as the number of "unread" items.

In FIG. 11, for example, the icon 53 for the "Frequently Asked Questions" category shows a "read: 1; unread: 4" badge 61b so as to understand that the number of viewed new incoming information items is 1, the number of unviewed new incoming information items is 4, and the total number of new incoming information items is 5.

A description will now be given of an operation of the image forming apparatus 10 for selecting a new incoming information item concerning the image forming apparatus 10 from among new incoming information items received by the new incoming information receiving unit 31 from the server apparatus 40 in accordance with apparatus information stored in the apparatus information storage unit 36 and adding the selected new incoming information item to a list of help information items.

While a single image forming apparatus 10 is illustrated in FIG. 1, the server apparatus 40 distributes help information to various image forming apparatuses 10 having different functions or specifications. Thus, the server apparatus 40 distributes help information in a uniform way regardless of the functions or specifications of the image forming apparatuses 10.

For an image forming apparatus 10 having no scanning function, a help information item concerning the scanning function is not useful and there is no need to add such a help information item to a list of help information items or to provide a new arrival notification.

Accordingly, when the new incoming information receiving unit 31 receives new incoming information items, the control unit 34 displays only the numbers of new incoming information items concerning the functions supported by the image forming apparatus 10 among the received new incoming information items as badges on the icons 53 on the help screen.

When the new incoming information receiving unit 31 receives new incoming information items, furthermore, the control unit 34 displays only the numbers of new incoming information items meeting the specifications of the image forming apparatus 10 among the received new incoming information items as badges on the icons 53 on the help screen.

A determination unit that determines whether or not there is any new incoming information item meeting the specifications of the image forming apparatus 10 may be included.

FIG. 12 illustrates an example of apparatus information stored in the apparatus information storage unit 36.

In the example apparatus information illustrated in FIG. 12, the following specifications are stored: the destination country "Japan", the automatic document feeder "available", the model name "D5575", the print speed "75 pages per minute", and the manual feed option "available".

The description will be given with reference to the reception of new incoming information illustrated in FIG. 13 by the new incoming information receiving unit 31 in the case where the apparatus information described above has been registered.

In the example new incoming information illustrated in FIG. 13, new incoming information items delivered from the server apparatus 40 include new incoming information items independent of the functions of the apparatus and new incoming information items dependent on the functions of the apparatus.

When the new incoming information items described above are received, the control unit 34 counts, for new incoming information items independent of the functions of the apparatus, the number of received new incoming information items as the number in the badge 61 attached to the corresponding icon on the help screen. Specifically, in FIG. 13, the number of new incoming information items for the "Frequently Asked Questions" category is added by "2", the number of new incoming information items for the "Scan" category is added by "1", and the number of new incoming information items for the "address registration/change" category is added by "1".

Then, the control unit 34 refers to the apparatus information illustrated in FIG. 12 to count only the numbers of new incoming information items meeting the functions or specifications of the image forming apparatus 10 among the new incoming information items dependent on the functions of the apparatus as the numbers in the badges 61.

For example, there are two types of new incoming information for the "Print" category, namely, new incoming information on a low-speed machine and new incoming information on a high-speed machine. Even in this case, the control unit 34 counts only the numbers of new incoming information items concerning printing with a low-speed machine if the image forming apparatus 10 is a low-speed machine. If a new incoming information item for the "Print" category is related to the printing of postcards using the manual feed slot, the control unit 34 confirms that the image forming apparatus 10 has the manual feed option by referring to the apparatus information illustrated in FIG. 12, and counts the number of new incoming information items for which a new arrival notification is provided.

In some cases, new incoming information includes display data for an explanatory screen for displaying the details of help information. When received help information is to be displayed, help information meeting the functions/specifications of the image forming apparatus 10 is displayed.

For example, an example in which different content is displayed depending on whether the image forming apparatus 10 is a high-speed machine or a low-speed machine will be described with reference to FIG. 14 and FIG. 15.

Figure 14:
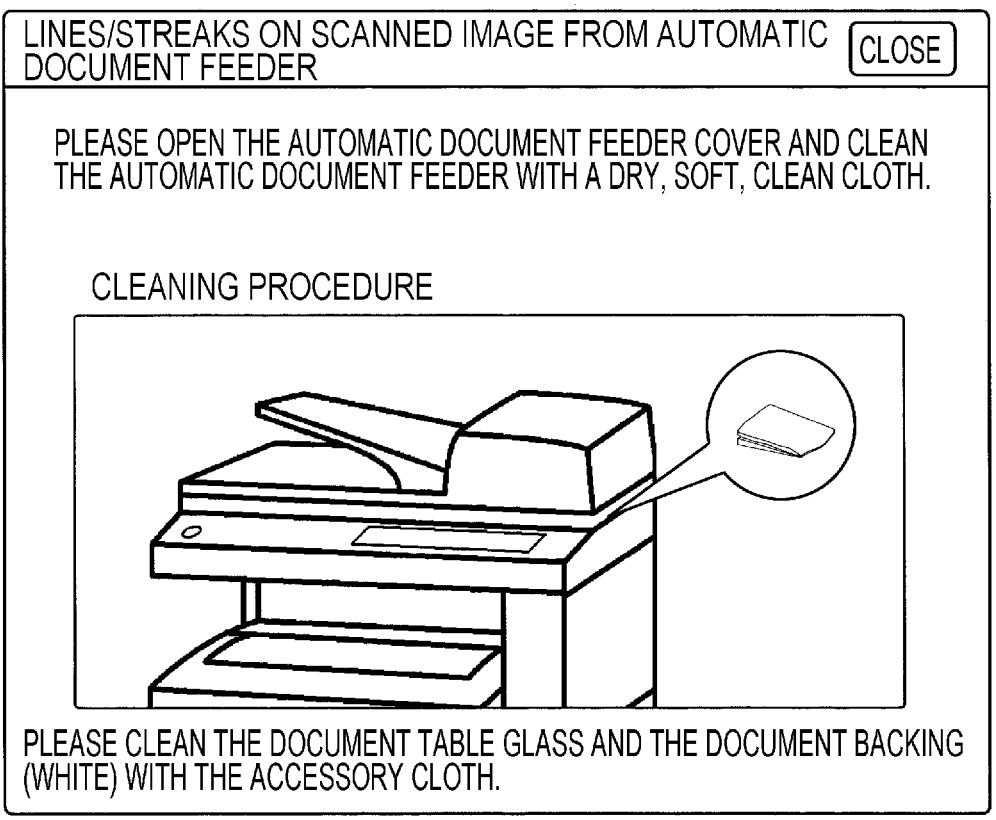
FIG. 14 illustrates an example display screen of help information when the image forming apparatus according to the first exemplary embodiment of the present invention is a high-speed machine.

FIG. 14 illustrates an example display screen of help information when the image forming apparatus 10 is a high-speed machine. The illustrated display screen is an example display screen displayed when a help information item having the content "Lines/streaks on scanned image from automatic document feeder" is selected from the list of help information items for the "Scan" category illustrated in FIG. 6 and is displayed.

Figure 15:
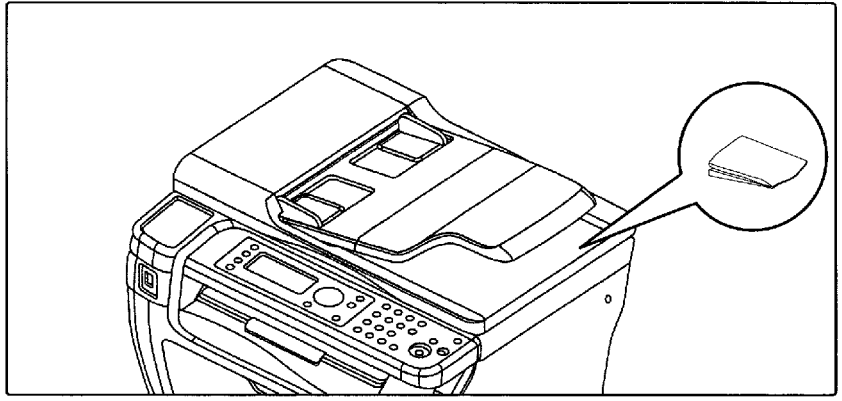
FIG. 15 illustrates an example display screen of help information when the image forming apparatus according to the first exemplary embodiment of the present invention is a low-speed machine.

FIG. 15 illustrates an example display screen of help information when the image forming apparatus 10 is a low-speed machine. As depicted in FIG. 15, even though an operation similar to that described above is performed, the displayed content corresponds to the outer appearance of a low-speed machine since the image forming apparatus 10 is a low-speed machine.

In this exemplary embodiment, the present invention is applied to a help icon for referring to help information on the respective functions for multiple icons displayed on a menu screen. However, the present invention is not limited to the application to help information and is also applicable to the case where an icon for providing or referring to information concerning the multiple icons is displayed on the same screen as that of the multiple icons.

Second Exemplary Embodiment

A second exemplary embodiment of the present invention will be described.

In the first exemplary embodiment described above, the present invention is applied to the image forming apparatus 10, such as a multifunction peripheral, by way of example. In the second exemplary embodiment of the present invention, the present invention is applied to a mobile phone apparatus 20, such as a smartphone illustrated in FIG. 16, by way of example.

The mobile phone apparatus 20 according to this exemplary embodiment includes a receiver that receives information such as electronic mails, and is configured to perform control to calculate the number of electronic mails (hereinafter referred to as emails) meeting a preset condition among the emails received by the receiver and to display the calculated number of emails as a badge on an icon for activating a program for referring to the received emails.

A description will be given of, as an example of the calculation of the number of emails meeting a preset condition, the counting of only the number of emails transmitted from senders whose address information is registered in address book data stored in the mobile phone apparatus 20. For instance, a determination unit that determines whether or not address information is registered in the address book data is included.

Figure 16:
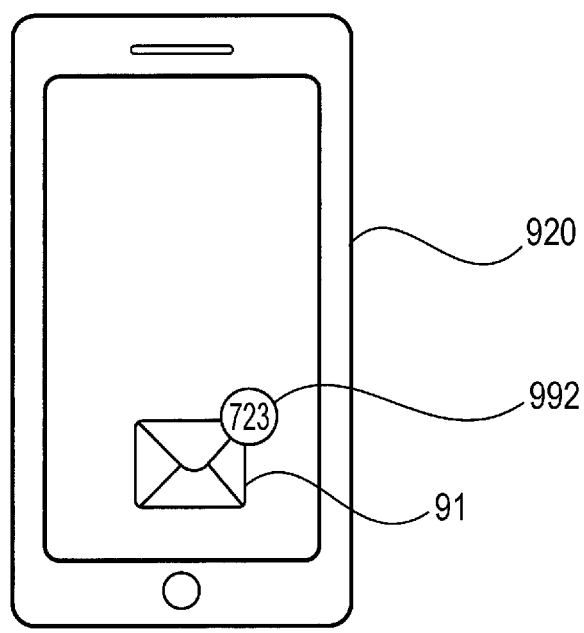
FIG. 16 illustrates an example of a display screen of a traditional mobile phone apparatus.

FIG. 16 illustrates an example display screen on a traditional mobile phone apparatus 920 on which the total number of received emails is displayed as a badge on an icon for activating an application program for transmitting and receiving an email (hereinafter referred to as an email application).

In FIG. 16, the number "723", which indicates the total number of received emails, is displayed as a badge 992 in the upper right corner of an email application icon 91 on the display screen of the mobile phone apparatus 920.

In contrast, example display screens on the mobile phone apparatus 20 according to this exemplary embodiment to which the techniques described above is applied will be described with reference to FIGS. 17A and 17B.

Figure 17A:
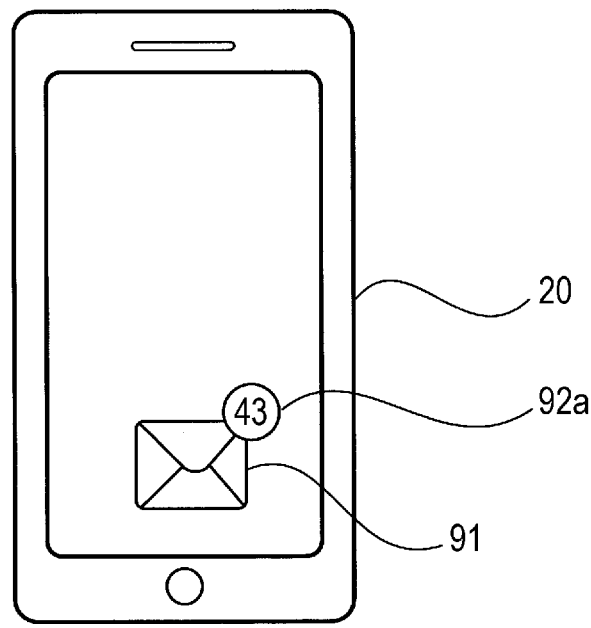
FIGS. 17A and 17B illustrate example display screens on a mobile phone apparatus according to a second exemplary embodiment of the present invention.

In FIG. 17A, the number "43", which indicates the total number of emails from the addresses registered in the address book among received emails, is displayed as a badge 92a in the upper right corner of the email application icon 91 on the display screen of the mobile phone apparatus 20.

Figure 17B:
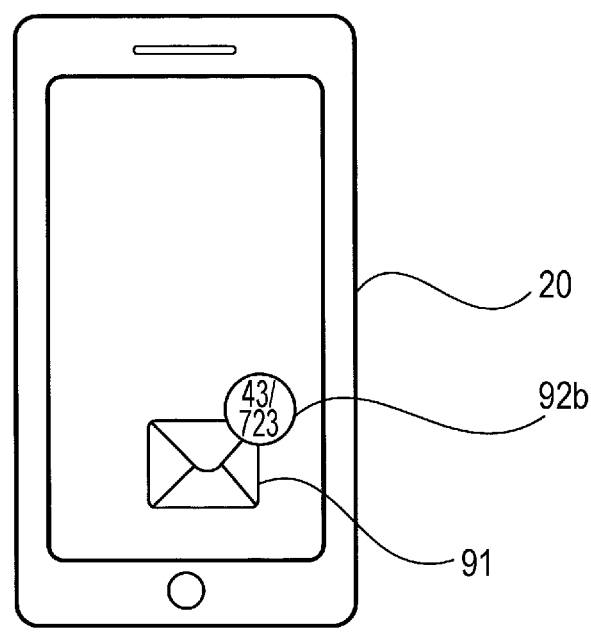

In FIG. 17B, the number "43", which indicates the total number of emails from the addresses registered in the address book among received emails, and the number "723", which indicates the total number of received emails, are both displayed as a badge 92b in the upper right corner of the email application icon 91 on the display screen of the mobile phone apparatus 20.

Figure 18:
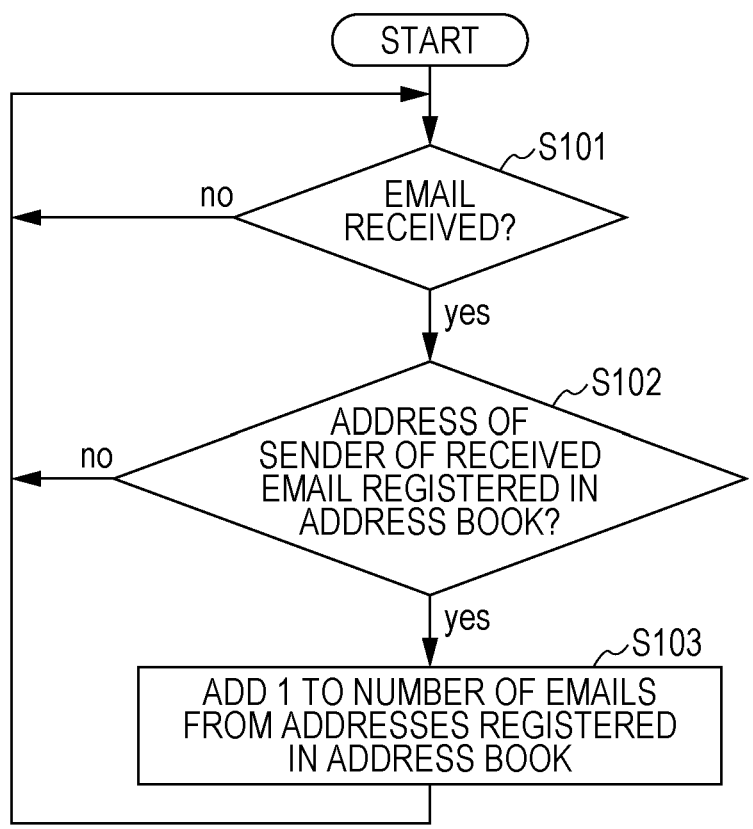
FIG. 18 is a flowchart illustrating a counting method for the mobile phone apparatus according to the second exemplary embodiment of the present invention.

A counting method for the mobile phone apparatus 20 to implement the process described above will be described with reference to a flowchart illustrated in FIG. 18.

When the receiver of the mobile phone apparatus 20 receives a new email (step S101), the mobile phone apparatus 20 determines whether or not the address of the sender of the received email is one of the addresses registered in an address book (step S102).

If the address of the sender is one of the addresses registered in the address book, the mobile phone apparatus 20 adds 1 to the number of emails from the addresses registered in the address book (step S103).

The mobile phone apparatus 20 repeatedly performs the process described above to accumulate the number of emails from the addresses registered in the address book among received emails to display the accumulated number of emails. In order to count and display the total number of received emails in the manner illustrated in FIG. 17B, a process for counting the number of received emails is inserted between steps S101 and S102.

As in this exemplary embodiment, not only the total number of received emails but also the number of emails transmitted from addresses registered in an address book is counted and displayed as a badge on an icon. This allows a user to observe the displayed badge to grasp the number of meaningful emails, rather than the number of unwanted or unsolicited emails, and may prevent the user from being distracted.

Exemplary Modifications

In the first exemplary embodiment described above, the present invention is applied to an image forming apparatus. However, the present invention is not limited to this exemplary embodiment and is also applicable to any other information processing apparatus such as a smartphone, a personal computer, or a tablet terminal apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor programmed to:
    receive a plurality of electronic messages;
    after counting a total number of the received plurality of electronic messages,
        (i) determine whether or not an address of a sender of a received electronic message is one of addresses registered in an address book of the image processing apparatus, and
        (ii) when the address is determined to be one of the addresses registered in the address book, add 1 to a separate counter counting a number of electronic messages received from addresses registered in the address book;
    repeat (i) and (ii) for each one of the received plurality of electronic messages; and
    display the number counted by the separate counter as a badge on an icon for activating an application that refers to the received electronic messages, wherein the number displayed as the badge on the icon is a number of both read and unread electronic messages.

2. The image processing apparatus according to claim 1, wherein the processor is programmed to
    display both the total number of the received plurality of electronic messages and the number counted by the separate counter, as the badge on the icon.

3. The image processing apparatus according to claim 1, wherein:
    the electronic messages are e-mails; and
    the application is an email application.

4. The image processing apparatus according to claim 1, wherein:
    the image processing apparatus is a smartphone; and
    the application is an email application on the smartphone.

5. The image processing apparatus according to claim 1, wherein:
    the application is an email application; and
    the badge is displayed on the icon for the email application.

6. A non-transitory computer readable medium storing a program causing a computer to execute a process for image processing, the process comprising:
    receiving a plurality of electronic messages;
    after counting a total number of the received plurality of electronic messages,
        (i) determining whether or not an address of a sender of a received electronic message is one of addresses registered in an address book of image processing apparatus including the computer, and
        (ii) when the address is determined to be one of the addresses registered in the address book, adding 1 to a separate counter counting a number of electronic messages received from addresses registered in the address book;
    repeating (i) and (ii) for each one of the received plurality of electronic messages; and
    displaying the number counted by the separate counter as a badge on an icon for activating an application that refers to the received electronic messages, wherein the number displayed as the badge on the icon is a number of both read and unread electronic messages.

7. A method for image processing performed by an image processing apparatus, the method comprising:
    receiving a plurality of electronic messages;
    after counting a total number of the received plurality of electronic messages, (i) determining whether or not an address of a sender of a received electronic message is one of addresses registered in an address book of the image processing apparatus, and (ii) when the address is determined to be one of the addresses registered in the address book, adding 1 to a separate counter counting a number of electronic messages received from addresses registered in the address book;

repeating (i) and (ii) for each one of the received plurality of electronic messages; and displaying the number counted by the separate counter as a badge on an icon for activating an application that refers to the received electronic messages, wherein the number displayed as the badge on the icon is a number of both read and unread electronic messages.

8. The image processing apparatus according to claim 1, wherein the processor is programmed to:

count a total number of the received plurality of electronic messages, wherein the total number of the received plurality of electronic messages includes a number of both read and unread electronic messages; and after the counting of the total number is completed, perform (i) and (ii).

* * * * *